UNITED STATES PATENT OFFICE 2,018,682

CORROSION INHIBITION

James E. McConkie, Portland, Oreg., assignor to American Can Company, New York, N. Y., a corporation of New Jersey No Drawing. Application July 6, 1931, Serial No. 549,089

12 Claims. (Cl. 91—68)

The present invention relates to new and useful improvements for preventing or inhibiting acid corrosion of filled and hermetically sealed metallic containers and has particular reference to the prevention of perforations and hydrogen swells in canned foods.

Certain canned products of an acid nature such as, for example, cherries and loganberries when hermetically sealed in metallic containers, corrode the interior of the can. Such cans are often interiorly enameled or lacquered. Frequently the corrosive action is concentrated on very small areas resulting in perforation or pinholing of the cans. Again—sufficient hydrogen gas may be generated in the corrosion process to produce hydrogen swells. Both of these conditions result in non-merchantable cans.

The present invention is directed to preventing pinholing and the formation of hydrogen swells in the container.

Experiments relating to the corrosion of interiorly enameled or lacquered metallic containers when packed with certain acid products have shown that sulphur compounds, as for example, calcium sulphite or sodium thiosulphate, or a mixture of the two, when present in small quantities have very beneficial results.

When incorporated with the ingredients of a protective coating material, such as lacquer or enamel and when homogeneously distributed through this coating material, preferably prior to its application to the tinplate from which the can is made, such compound becomes a component part of the coating material. Containers interiorly lined with such a coating are not so subject to acid corrosion, and perforations and hydrogen swells are minimized or avoided. The entire inside of the can, i. e., the inner surface of the body and the ends, should carry such a lacquer or enamel coating in order to produce the desired inhibition.

It will be understood that the words "lacquer" and "enamel" are broadly used. Other satisfactory vehicle or carrier for the sulphur compounds may be used which are not strictly classified as lacquers or enamels such as, for example, gelatin, casein, agar agar, etc., and this broad interpretation of the terms should be borne in mind in connection with the present invention.

In carrying out the invention according to one satisfactory method of procedure, a sulphur compound of the character specified is properly mixed with the ingredients forming the lacquer or enamel used as a coating for the metal of the can. The desired quantity of calcium sulphite, for example, is mixed with the coating material in the proper quantities to produce a coating on the sheet metal which carries quantities of sulphur compound varying from .01 milligrams to .5 milligrams (expressed as sulphur) per square inch of coated surface.

The following varnish mixtures from which the lacquer or enamel is made have proved practical in actual use for incorporation with the sulphur compound:

| | Pounds |
|---|---|
| #6 Congo | 60 |
| B2 Kauri | 15 |
| Raw China-wood oil | 70 |
| Heat treated linseed oil | 16 |
| Heat treated perilla oil | 6 |
| Manganese resinate | 1 |

In making up this mixture, the fossil resins are melted by the application of heat and thoroughly incorporated while in the melted state with the China-wood oils and driers. Sufficient varnish thinner is added to reduce the non-volatile content of the mixture to approximately 45%. Fifty-five (55#) pounds of calcium sulphite are then stirred into forty-five (45#) pounds of the varnish preparation and the resulting mixture is passed through a paint mill in order to grind and thoroughly incorporate the calcium sulphite with the ingredients of the varnish.

A heavy paste is thus produced in the grinding process and this paste is then further stirred with more of the varnish preparation, preferably in the proportion of one pound of paste to nine pounds of varnish.

The lacquer or enamel thus produced is preferably applied to the tinplate while in the flat or sheet form. This application of enamel and the subsequent baking of it on the sheet is carried out in the usual manner, the lined tinplate then being subjected to the necessary operations for the production of an interiorly coated can.

Such incorporated sulphur compounds become permanently embodied in the lacquer or enamel coating, the baking operation holding them in place in the coating. Following processing of the product or other steps to which the sealed can is subjected and during the period of distribution or storage of the cans, the sulphur compounds in their linings carry on their beneficial work of minimizing and preventing the development of perforations and the development of hydrogen swells.

It is thought that the invention and many of its attendant advantages will be understood from the foregoing description and it will be apparent that various changes may be made in the steps and their order of accomplishment of the process described without departing from the spirit and scope of the invention or sacrificing all of its material advantages, the process hereinbefore described being merely a preferred embodiment thereof.

I claim:

1. The method of inhibiting interior corrosion in hermetically sealed metallic containers which comprises, providing the inside surfaces of the metal with a holding coating having a calcium sulphite incorporated therein and homogeneously distributed therethrough.

2. The method of inhibiting interior corrosion in hermetically sealed metallic containers which comprises, providing the inside surfaces of the metal with a holding coating having a sodium thio-sulphate incorporated therein and homogeneously distributed therethrough in an amount sufficient to prevent corrosion of the cans due to fruit acids contained therein.

3. The method of inhibiting internal corrosion in hermetically sealed metallic containers which comprises, providing the inside surfaces of the metal with a baking lacquer coating having an inorganic sulphur compound incorporated therein and homogeneously distributed therethrough in an amount and of such character as to inhibit corrosion due to the presence of acids in cherries and loganberries.

4. A metal container provided with an interior coating comprising a mixture of gum, oil, manganese resinate and a calcium sulphite, baked on the metal.

5. A coating product for lining metallic cans comprising, a lacquer having a sulphur compound selected from the group consisting of calcium sulphite and sodium thiosulphate distributed therethrough in an amount sufficient to prevent corrosion of the cans due to fruit acids contained therein.

6. The method of inhibiting internal corrosion in hermetically sealed metallic containers which comprises, providing the inside surfaces of the metal with a baked on holding lacquer coating having a mixture of calcium sulphite and sodium thiosulphate incorporated therein and homogeneously distributed therethrough in an amount sufficient to prevent corrosion of the cans due to fruit acids contained therein.

7. A coating product for lining metallic cans comprising, a lacquer having sulphur compounds consisting of a mixture of calcium sulphite and sodium thiosulphate distributed therethrough in an amount sufficient to prevent corrosion of the cans due to fruit acids contained therein.

8. A can comprising a metallic body and ends, the inner surfaces of which are covered with a baking lacquer throughout which an inorganic sulphur compound mixture of calcium sulphite and sodium thiosulphate is distributed in an amount sufficient to prevent corrosion of the cans due to fruit acids contained therein.

9. A product for application as an interior lining to and baking on the interior surface of metallic cans to inhibit internal corrosion therein when hermetically enclosing acid food products, which comprises a coating composition and a sulphur compound selected from the group consisting of calcium sulphite and sodium thiosulphate homogeneously distributed throughout the coating composition in an amount sufficient to prevent corrosion of the cans due to fruit acids contained therein.

10. A can comprising a metallic body and ends, the inner surfaces of which are covered with a baking lacquer throughout which an inorganic sulphur compound selected from the group consisting of calcium sulphite and sodium thiosulphate is distributed in an amount sufficient to prevent corrosion of the cans due to fruit acids contained therein.

11. A tin receptacle having its interior covered with a resinous material in which is incorporated a sulphur compound selected from the group consisting of calcium sulphite and sodium thiosulphate in an amount sufficient to prevent corrosion of the cans due to fruit acids contained therein.

12. A metal container provided with an interior coating comprising a mixture of gum, oil, manganese resinate and a sulphur compound selected from the group consisting of calcium sulphite and sodium thiosulphate, baked on the metal in an amount sufficient to prevent corrosion of the cans due to fruit acids contained therein.

JAMES E. McCONKIE.